(12) United States Patent
Jossick

(10) Patent No.: US 9,314,862 B2
(45) Date of Patent: Apr. 19, 2016

(54) PROCESS FOR FLUX COATING BRAZE PREFORMS AND DISCRETE PARTS

(71) Applicant: Lucas-Milhaupt, Inc., Cudahy, WI (US)

(72) Inventor: Daniel J. Jossick, Exeter, NH (US)

(73) Assignee: Lucas-Milhaupt, Inc., Cudahy, WI (US)

( * ) Notice: Subject to any disclaimer, the term of this patent is extended or adjusted under 35 U.S.C. 154(b) by 0 days.

(21) Appl. No.: 14/292,120

(22) Filed: May 30, 2014

(65) Prior Publication Data

US 2014/0374469 A1 Dec. 25, 2014

Related U.S. Application Data

(60) Provisional application No. 61/829,109, filed on May 30, 2013.

(51) Int. Cl.
| | |
|---|---|
| *B23K 1/20* | (2006.01) |
| *B05D 1/22* | (2006.01) |
| *B23K 3/08* | (2006.01) |
| *B23K 35/02* | (2006.01) |

(52) U.S. Cl.
CPC ............... *B23K 1/203* (2013.01); *B23K 1/206* (2013.01); *B23K 3/082* (2013.01); *B23K 35/0244* (2013.01)

(58) Field of Classification Search
CPC ..... B23K 1/203; B23K 35/0244; B23K 3/082
USPC ................................ 228/207, 223; 427/421.1
See application file for complete search history.

(56) References Cited

U.S. PATENT DOCUMENTS

| | | | |
|---|---|---|---|
| 400,869 | A | 4/1880 | Norton et at |
| 1,629,748 | A | 5/1927 | Stoody |
| 1,968,618 | A | 2/1932 | Padgett et al. |
| 2,499,641 | A | 3/1950 | Goody |
| 2,958,941 | A | 11/1960 | Goerg |
| 3,077,131 | A | 2/1963 | McShane |
| 3,162,551 | A | 12/1964 | Short |
| 3,542,998 | A | 11/1970 | Huff |
| 3,619,429 | A | 11/1971 | Torigai et al. |
| 3,620,869 | A | 11/1971 | Stump et al. |
| 3,642,998 | A | 2/1972 | Jennings |
| 3,935,414 | A | 1/1976 | Ballass et al. |
| 3,967,036 | A | 6/1976 | Sadowski |
| 4,041,274 | A | 8/1977 | Sadowski |

(Continued)

FOREIGN PATENT DOCUMENTS

| | | |
|---|---|---|
| FR | 7812546 | 11/1977 |
| JP | 63303694 | 12/1988 |

(Continued)

OTHER PUBLICATIONS

"Rotamat Surface Preparation." Mar. 16, 2010. <<http://web.archive.org/web/20100316101905/http://www.surfacepreparation.com/product/rotamat-parts-coating-system>>.*

*Primary Examiner* — Alexander Weddle

(74) *Attorney, Agent, or Firm* — Boyle Fredrickson, S.C.

(57) ABSTRACT

Systems and methods for evenly applying a flux coating to any number of different shaped parts with a single machine are described. The systems and methods provide advantages in that the flux coating may be applied accurately within 2% to 4% of desired thickness with 85% to 95% of the total yield of flux being applied, this minimizing waste. Thousands of parts may be batch treated with a single machine without operator input.

20 Claims, 7 Drawing Sheets

(56) References Cited

U.S. PATENT DOCUMENTS

| | | |
|---|---|---|
| 4,301,211 A | 11/1981 | Sloboda |
| 4,379,811 A | 4/1983 | Puschner et al. |
| 4,447,472 A | 5/1984 | Minnick et al. |
| 4,493,738 A | 1/1985 | Collier et al. |
| 4,497,849 A | 2/1985 | Hughes et al. |
| 4,504,007 A * | 3/1985 | Anderson et al. ......... 228/123.1 |
| 4,571,352 A | 2/1986 | Aoki |
| 4,587,097 A | 5/1986 | Rabinkin et al. |
| 4,624,860 A | 11/1986 | Alber et al. |
| 4,624,866 A * | 11/1986 | Cheng et al. ................. 427/190 |
| 4,831,701 A | 5/1989 | Yutaka |
| 5,098,010 A | 3/1992 | Carmichael et al. |
| 5,316,206 A | 5/1994 | Syslak et al. |
| 5,368,219 A * | 11/1994 | Hogan et al. ..................... 228/33 |
| 5,418,072 A | 5/1995 | Baldantoni et al. |
| 5,450,666 A * | 9/1995 | Conn et al. ............... 29/890.043 |
| 5,575,933 A | 11/1996 | Ni |
| 5,749,971 A | 5/1998 | Ni |
| 5,759,707 A | 6/1998 | Belt et al. |
| 5,781,846 A | 7/1998 | Jossick |
| 5,791,005 A | 8/1998 | Grabowski et al. |
| 5,903,814 A | 5/1999 | Miura et al. |
| 6,093,761 A | 7/2000 | Schofalvi |
| 6,204,316 B1 | 3/2001 | Schofalvi |
| 6,234,381 B1 * | 5/2001 | Hasegawa et al. ............. 228/223 |
| 6,244,397 B1 | 6/2001 | Kars |
| 6,248,860 B1 | 6/2001 | Sant'Angelo et al. |
| 6,264,062 B1 | 7/2001 | Lack et al. |
| 6,277,210 B1 | 8/2001 | Schuster |
| 6,317,913 B1 | 11/2001 | Kilmer et al. |
| 6,344,237 B1 | 2/2002 | Kilmer et al. |
| 6,376,585 B1 | 4/2002 | Schofalvi et al. |
| 6,395,223 B1 | 5/2002 | Schuster et al. |
| 6,409,074 B1 | 6/2002 | Katoh et al. |
| 6,432,221 B1 | 8/2002 | Seseke-Koyro et al. |
| 6,497,770 B2 | 12/2002 | Watsuji et al. |
| 6,680,359 B2 | 1/2004 | Schoenheider |
| 6,713,593 B2 | 3/2004 | Ree et al. |
| 6,733,598 B2 | 5/2004 | Swidersky et al. |
| 6,830,632 B1 | 12/2004 | Fuerstenau et al. |
| 6,846,862 B2 | 1/2005 | Schofalvi et al. |
| 6,864,346 B2 | 3/2005 | Schoenheider |
| 2002/0139519 A1 * | 10/2002 | Hosoya et al. ................. 165/133 |
| 2003/0203137 A1 | 10/2003 | Teshima et al. |
| 2004/0009358 A1 | 1/2004 | Scott et al. |
| 2004/0016793 A1 * | 1/2004 | Zhao et al. ..................... 228/204 |
| 2004/0171721 A1 | 9/2004 | Esemplare |
| 2005/0008771 A1 | 1/2005 | Goto |
| 2005/0129855 A1 | 6/2005 | Kamata et al. |
| 2007/0093574 A1 | 4/2007 | Esemplare |
| 2007/0251602 A1 * | 11/2007 | Gagnon et al. .................. 148/26 |
| 2010/0099806 A1 * | 4/2010 | Houze et al. .................. 524/280 |

FOREIGN PATENT DOCUMENTS

| | | |
|---|---|---|
| WO | WO99/00444 | 1/1999 |
| WO | WO00/39172 | 7/2000 |
| WO | WO00/52228 | 9/2000 |
| WO | WO00/64626 | 11/2000 |
| WO | WO02/00569 | 1/2002 |
| WO | WO02/31023 | 4/2002 |
| WO | WO03/068447 | 8/2003 |
| WO | WO03/089176 | 10/2003 |
| WO | WO2005/061871 | 7/2004 |
| WO | WO2004/094328 | 11/2004 |

* cited by examiner

PRIOR ART

PRIOR ART

PROCESS FOR FLUX COATING BRAZE PREFORMS AND DISCRETE PARTS

CROSS REFERENCE TO RELATED APPLICATION

This application claims the benefit of U.S. Application No. 61/829,109 filed May 30, 2013, the entirety of which is herein incorporated by reference.

BACKGROUND OF THE INVENTION

1. Field of the Invention

The Field of Invention relates generally to flux and braze alloys, and specifically to flux coated braze alloy preforms.

2. Discussion of the Related Art

Flux is known in the art of brazing to remove oxides from the parent metal or alloy part and allow the filler metal to properly bond. Traditionally, flux has been applied to the parent part manually in the form of a paste or liquid just prior to brazing. Over time, various companies have produced filler metals that include a pre-applied flux. These filler metals with included flux eliminate the need for an operator to manually apply flux.

The manufacture of filler metals with pre-applied flux has been known as an expensive process as waste is often produced. The filler material is often dipped into a bath of flux which may result in excessive flux adhering to the filler material. This not only wastes precious flux material, but also requires extended cleaning operations following brazing as the excess flux leaves behind residue or an unsightly appearance. As the filler metal is immersed in a flux solution, it may contact other objects and the curing flux may join with the other object. Flux may also puddle or run off the part and produce overall inconsistent coatings.

Filler material is also often bent or shaped into various "preforms" such as a wire bent into a ring, helix, triangle, or any other shape. Applying flux to the preform after it is shaped extends the cycle time of production, while forming the wire into a preform following flux application often results in the flux chipping or cracking.

Additionally, many machines that apply flux to a filler metal or preform are unique to the individual part that is being treated. Oftentimes, expensive dies or machines are custom made for applying flux to a single part.

What is therefore needed is a way to apply flux to a filler metal, preform, or any object in a consistent manner. What is also needed is a way to apply the flux with minimal material handling. A way to apply a flux coating to any number of differently shaped parts with the same machine is hereby needed.

SUMMARY AND OBJECTS OF THE INVENTION

A method of applying a flux coating on a plurality of parts for a brazing operation may include tumbling the parts in a tumbling drum with a controlled atmosphere including a user-definable temperature and humidity within the tumbling drum. The parts may be cycled through a coating cycle within the drum. The cycle may include spraying a flux from at least one nozzle within the tumbling drum while the parts are tumbling for a user-defined period of time. The parts may ultimately be coated with flux with a uniform thickness within 2% to 4% of a desired thickness.

Following spraying, the parts may be tumbled for an additional user-defined period of time to cure the flux to a desired hardness. The coating cycle may then be repeated any number of times to build up a sufficient coating. The uniform thickness of the coating on the parts is thereby uniformly, incrementally increased with each coating cycle.

An alternative flux coating method for applying a flux coating on a plurality of parts for use for brazing may also include setting the parts on a conveyor that transports the parts into an enclosure with a plasma cleaning chamber to remove contaminants allowing a proper adhesion of the flux coating to the parts. The parts may then advance to a heating chamber to heat the parts with infrared light to promote better adhesion and curing of the flux. Following heating, the parts may advance to an ultrasonic flux spraying chamber where the parts may be sprayed with an ultrasonic sprayer configured to atomize a liquid flux solution and coat a single side of the parts with the flux coating, leaving an opposing side of the part free of the flux coating.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention and of the construction and operation of typical mechanisms provided with the present invention will become more readily apparent by referring to the exemplary, and therefore non-limiting, embodiments illustrated in the drawings accompanying and forming a part of this specification, wherein like reference numerals designate the same elements in the several views, and in which.

Figure 1:
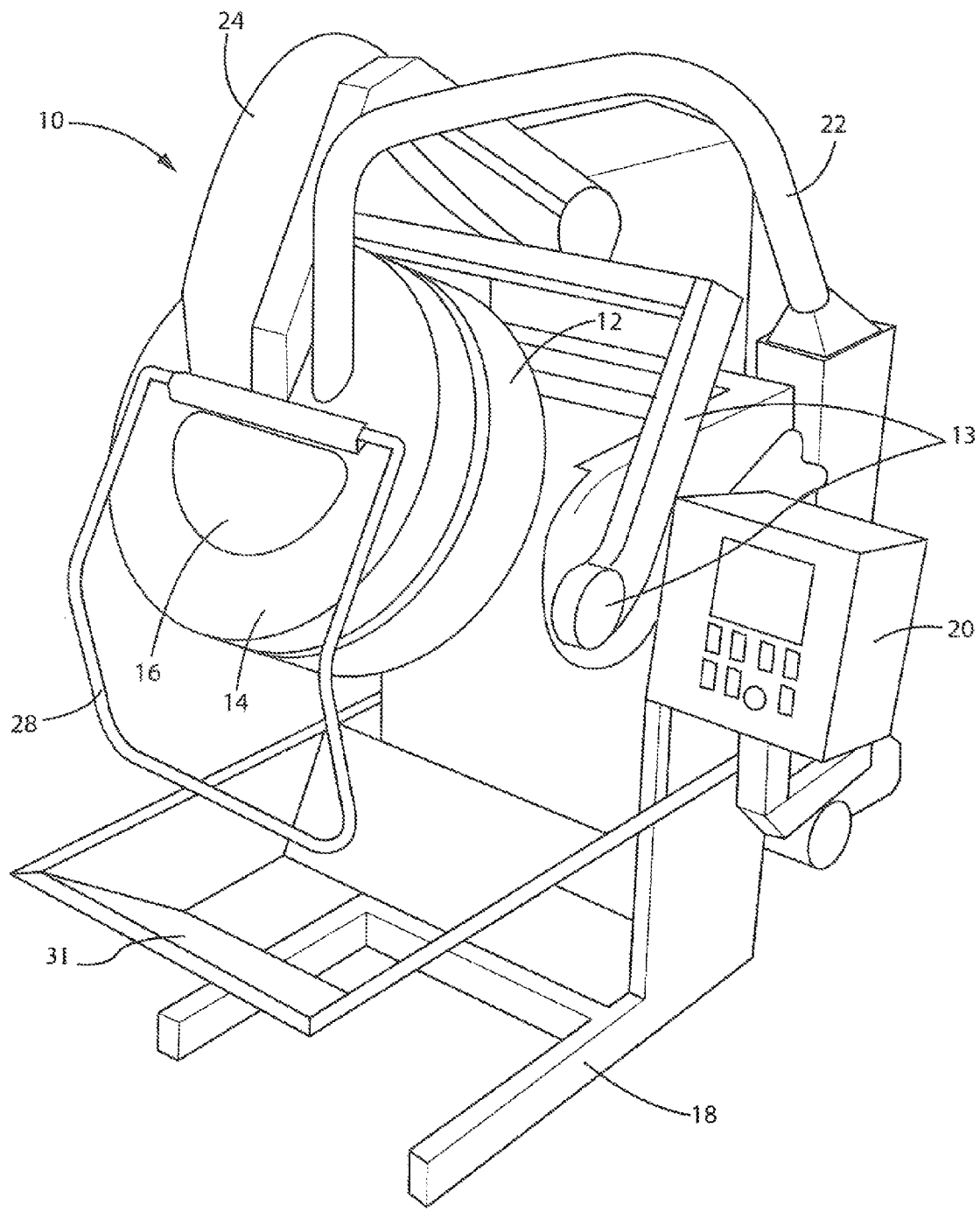
FIG. 1 illustrates a perspective view of a drum sprayer.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description.

1. Resume

A process method for Flux Coating Braze preforms and Discrete parts.

A Spray Flux Coating and binder system for coating Braze preform and discrete parts.

Process Description:

The process consists of a totally enclosed rotating drum and spray mechanism using controlled heat and positive pressure to efficiently and economically flux coat a wide range of Braze preforms and cladded discrete parts.

Spray Flux Coating Description:

Spray Flux Coating formulation is designed to operate continuous and intermittent spray processes including fine micro spray systems. The coating consists of a compatible braze flux, adhesive resin, and Non VOC solvent carrier that is sprayed onto braze preforms and functional braze alloy cladded discrete components requiring braze flux. Physical functional properties of the resultant flux coating yields a controlled range of adhesive strength, durability, hardness, and flexibility to comply with designated handling requirements for packing and process loading. The operational or duty properties are constant with Flame, Induction, or Controlled atmosphere furnace requirements.

The Flux Coating Process:
1. Coats a wide size range of multi-dimensional wire forms at a time.
2. Coats a wide size range of multi-dimensional disc forms at a time.
3. Coats wide size range of multi-dimensional shim forms at a time.
4. Coats wide size range of multi-dimensional discrete parts forms at a time.
5. All parts in batch are coated equally dimensionally (tight tolerances).
6. All parts in batch are coated equally by weight (tight tolerances).
7. Process is repeatable.
8. Process settings are PLC controlled and stored with optional infrared sensors (integrated report management).
9. Process is temperature and pressure PLC controlled.
10. Process is temperature and pressure PLC controlled.
11. Process is fluid spray volume is PLC controlled.
12. Process RPM is PLC controlled.
13. Process drum angle is PLC controlled.
14. Process spray pattern is PLC controlled.
15. Process internal negative pressure is PLC controlled.
16. Process air flow velocity is PLC controlled.
17. Spray volumes are recorded and monitored by PLC and gravimetric scale.
18. Provides humidity and temperature control of air.
19. Coating fluid can be cooled or heated.
20. Exhaust monitoring.
21. Solvent-free cleaning capability.
22. Process is not operator-dependent once started.
23. Process functions can be adjusted at any time during operation.
24. Process is clean to environment.
25. Coating yield efficiency is high. Liquid coating is contained and enclosed. All coating goes on parts other than fine plume spray that is exhausted.
26. Eliminates an alloy material scrap.
27. Process provides for quick and easy changeover to other materials.
28. No risk of cross contamination.
29. No post heating or curing required.
30. Single Load, does not require fixturing or tooling.
31. Small footprint.

Flux Coating Claims:
1. Less than 50 ppm residual ash content of binder.
2. Low temperature decomposition 250-280C.
3. Functional in air and controlled atmosphere conditions.
4. Coating is hard, durable flexible.
5. Functions in Microspray atomization nozzles.

Various manufacturers which produce HVAC components for automotive and commercial industries are eliminating in-house fluxing systems in favor of pre flux coated parts for improvements to overall cost, quality, output, environmental, and lean initiatives. Though some manufacturers opt to flux coat self-produced parts on site for practical reasons, there is a significant demand to outsource flux coated discrete Al Clad parts. Improved cost, quality, and versatility may be achieved through binder technology and uniqueness of process, i.e., using the tumbling drum. The binder and process yield precision placement and loading of flux with virtually no waste or byproduct.

2. Detailed Description of Preferred Embodiments

Figure 2:
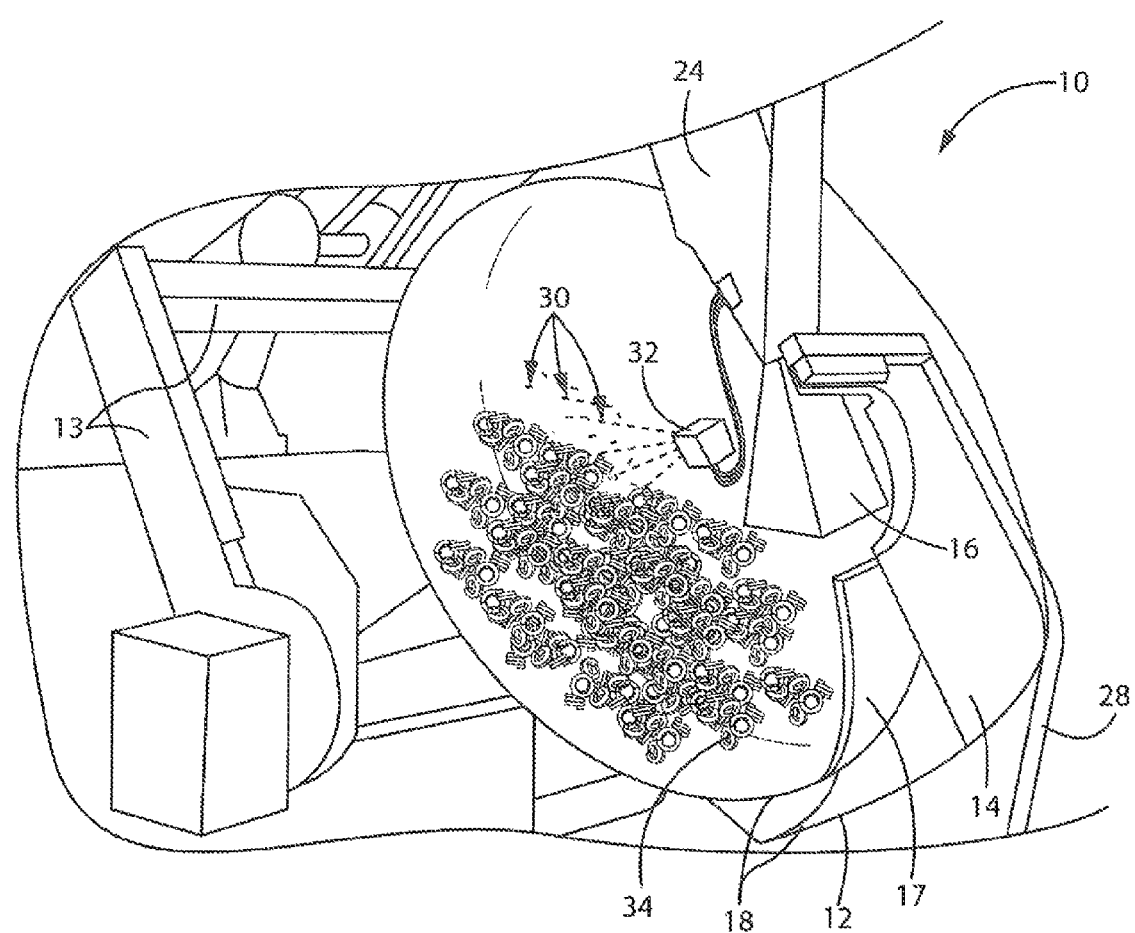
FIG. 2 illustrates a partial cross sectional view of the drum sprayer of FIG. 1.
Figure 3:
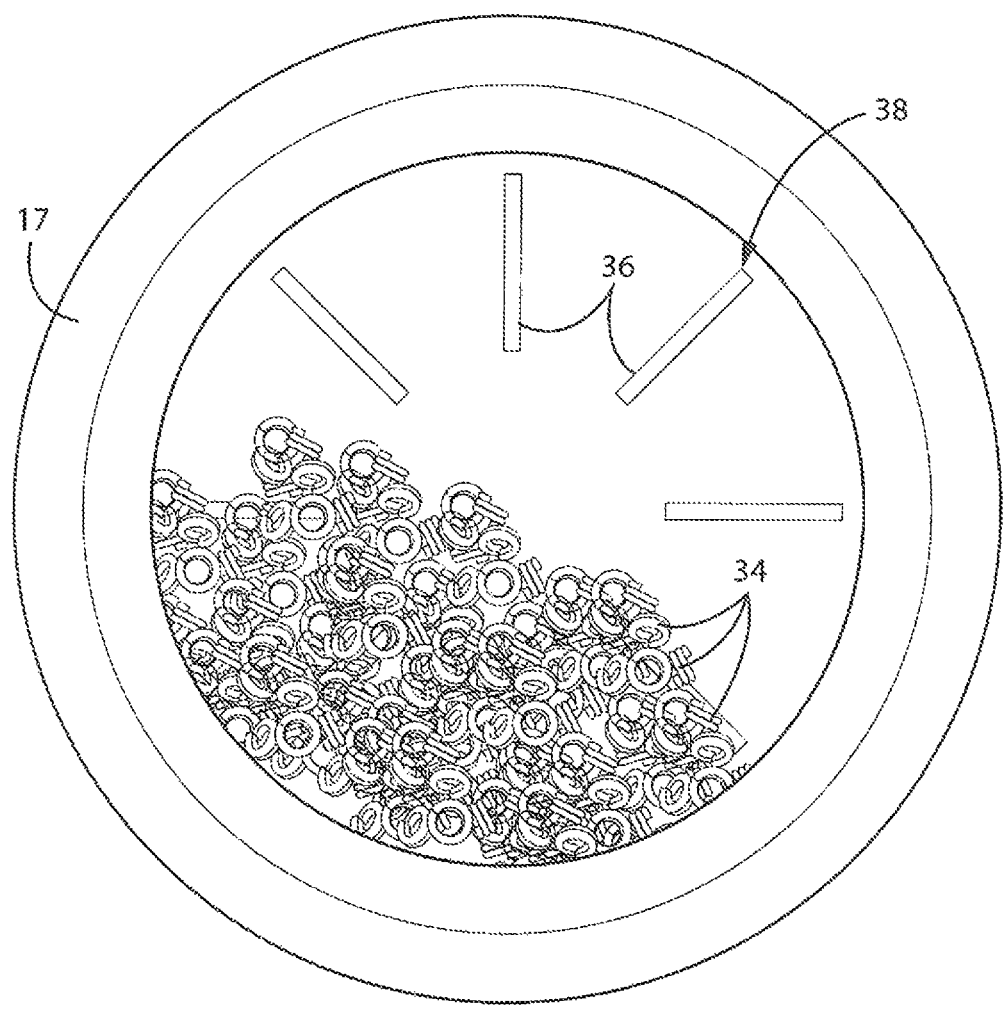
FIG. 3 illustrates a top view of the interior of the drum from the drum sprayer of FIG. 1.
Figure 4:
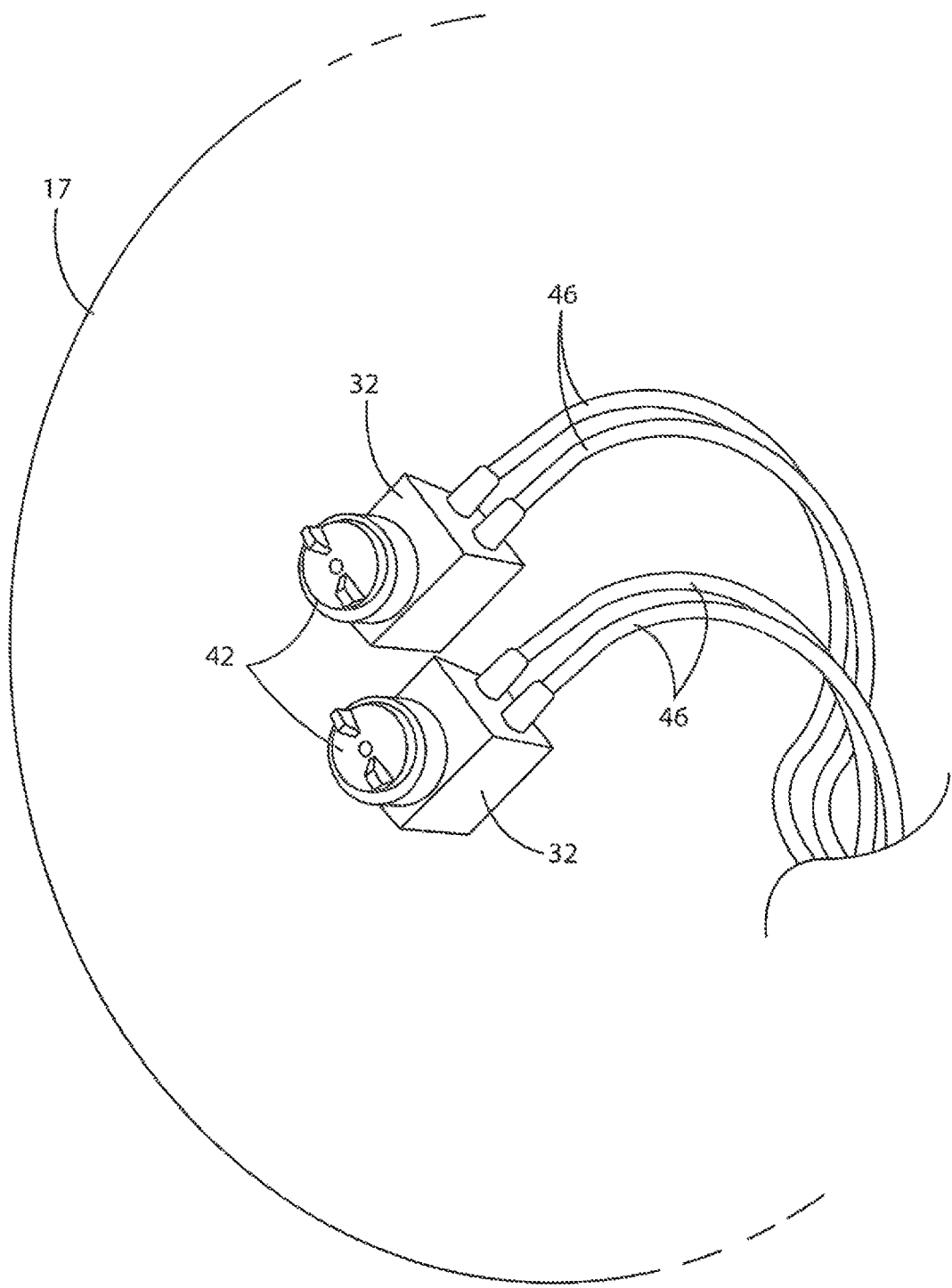
FIG. 4 illustrates a perspective view of an alternative embodiment of the drum sprayer of FIG. 1 with dual sprayers.
Figure 5:
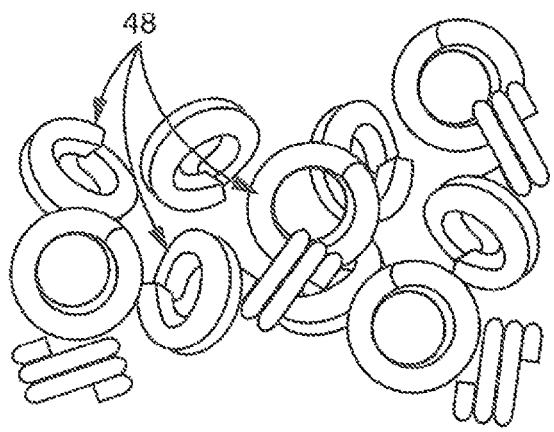
FIG. 5 illustrates a perspective view of flux coated rings produced with the drum sprayer of FIG. 1.
Figure 6:
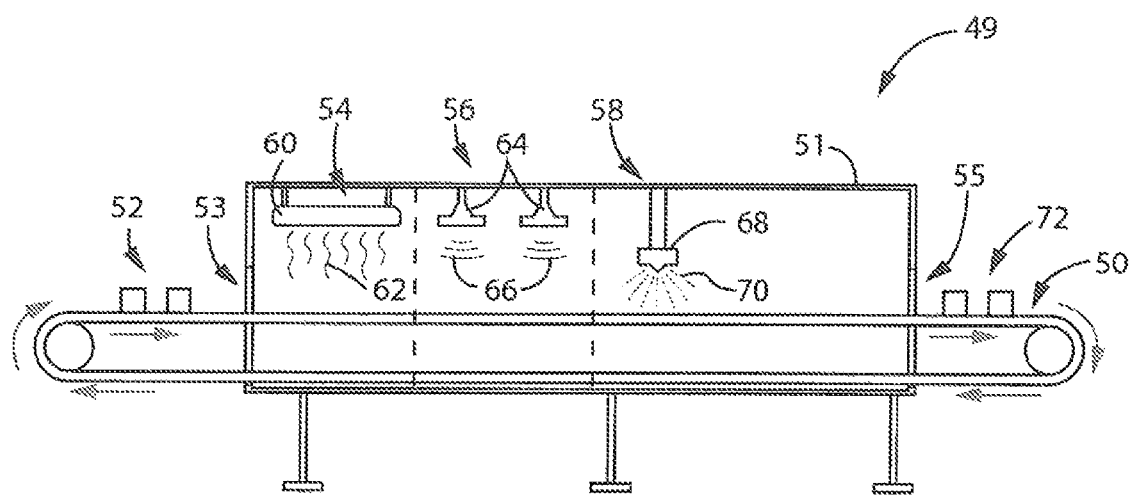
FIG. 6 illustrates a side view of an alternative flux coating machine.

Beginning with FIG. 1, a drum sprayer 10 is shown. The drum sprayer may include any machine configured to tumble parts under a controlled atmosphere and apply a coating. In this embodiment, the drum sprayer 10 is a ROTAMAT™ machine manufactured by Walther Trowal. The drum sprayer 10 rests on a frame 18 for securing it to the floor. A lid 14 mates with an enclosure 12 to secure the drum 17 during operation, as seen in FIG. 2. A handle 28 allows an operator to separate the lid 14 from the enclosure 12 to insert and remove parts from the drum 17. During operation of the drum sprayer 10, the operator may view the progress of the parts within the drum 17 through a view port 16.

In order to control the atmosphere within the drum 17, a control panel 20 with a series of buttons and a monitor allows an operator to configure drum rotation speed and humidity within the drum 17, air temperature within the drum 17, and the amount of flux sprayed from nozzle 32, as seen in FIG. 2. Nozzle size is preferable 0.050 in to 0.080 in but any spray nozzle size may be used. Exhaust duct 24 may also be used to circulate the air within the drum 17 to control the atmosphere. An air inlet hose 22 may also provide air to the drum 17 that is conditioned to a desired humidity and temperature.

Following completion of operation, the enclosure 12 and lid 14 may be pivoted about arm pivot 13 allowing an operator to dump the treated parts into the funnel 31 for collection into a vessel below the funnel 31.

Turning now to FIG. 2, a partial cut-away 18 of the drum sprayer is shown. The cut-away 18 exposes the interior of the lid 14 and enclosure 12. The interior of the drum 17 is also shown. The cut-away 18 exposes the contents of the drum 17 during operation wherein a sprayer 32 is actively spraying an atomized flux spray 30 onto brazing parts 34 at a preferred atomizing pressure. During operation of the drum sprayer 10, the drum 17 continuously rotates and agitates the brazing parts 34 within. The brazing parts 34 are preferably cleaned of any oils or residues prior to being placed within the drum 17.

While not mandatory, the brazing parts 34 may receive a surface treatment to promote adhesion of the atomized flux spray 30. This ensures proper surface finish and surface tension. The surface treatment may include simply cleaning the parts as well as adjusting the surface finish and tension through the use of an abrasive such as an abrasive tumbling machine.

After the brazing parts 34 are inserted into the drum 17, the drum sprayer is activated and the drum begins to rotate and tumble the brazing parts within. The humidity and temperature within the drum may be fine tuned to achieve the best adhesion and uniformity of atomized flux spray 30. The rotational speed of the drum may also be fine tuned to ensure optimal coating.

As the brazing parts 34 are tumbled, the sprayer 32 emits the atomized flux spray to evenly coat the brazing parts 34 with flux. The exhaust duct 24 draws out any overspray and prevents the atomized flux spray from adhering to the drum 17. The brazing parts 34 are coated with flux within 2% of the desired thickness. For example, if a 0.0050 in coating of flux is desired, the process is capable of producing a flux coating between 0.0051 in and 0.0049 in evenly and uniformly on hundreds, even thousands, of parts simultaneously.

Preferably, the sprayer does not spray the entire thickness of desired flux coating in one spray operation. Optimal results are achieved by spraying multiple coatings with a curing cycle between each spray cycle. The drum continuously rotates, agitating the brazing parts 34 during the curing cycle, and the sprayer 32 is deactivated. The temperature within the drum 17 preferably is 30-50 degrees Celsius; however, it may be adjusted for different flux coatings or different thickness of coatings. Due to the specific mixture of ingredients in the flux, the coating cures to a sufficient hardness and is durable to remain in tumbling in the drum without chipping or otherwise damaging the coating of flux. The flux formulation, including the binder, may also be adjusted for different-shaped parts. Different binders, formulations, and fluxes are shown in the following tables and examples.

As the drum 17 constantly tumbles the brazing parts 34, each part sees the same amount of spray time from the sprayer 32 and is uniformly coated. Due to the efficiency of the sprayer and the tumbling operation, 85% through 95% of the flux that is sprayed through the sprayer 32 is coated onto the brazing parts. This prevents waste and reduces manufacturing costs. Total flux coating time can vary depending on the desired thickness and the size of the parts to be coated. For example, some batches take as low as 15 minutes while others may take 25 hours. Additionally, once the drum sprayer 10 is loaded and set up, it may run unattended through multiple spray and curing cycles. This reduces labor costs and allows a single operator to run multiple machines at the same time.

Moving on to FIG. 3, the interior 38 of the drum 17 may be seen. In this view, the lid 14 has been removed allowing access to the interior 38. This allows an operator to load and unload brazing parts 34. While the brazing parts 34 shown in FIG. 3 are brazing caps, virtually any shaped brazing object may be coated with flux using the drum sprayer 10. Shims, rings, caps, washers, or any other three dimensional shaped part may be treated. Any metal or metal alloy may also be treated. The tumbling action of the drum ensures a very uniform and even spray of flux. The repeated curing and spraying cycles while the brazing parts 34 are tumbled ensure the coating is built up gradually and evenly in very fine increments without puddles or runs in the flux coating. Additionally, agitators 36 help tumble the brazing parts 34 as the drum 17 is rotated.

In order to cut down even further on operator time, FIG. 4 shows an embodiment where multiple sprayers 32 are included inside the drum 17. In this view, the sprayers 32 can be seen in more detail. Spray nozzles 42 are adjustable not only directionally, but the spray cone may be fine tuned as well. This allows for even more adjustability when different flux compounds or binders are used. While any spray nozzle 42 size may be used, ideally 0.050 in to 0.080 in produces optimal results. Hoses 46 deliver the flux compound to the sprayers 32. As there are multiple sprayers 32 in this embodiment, each sprayer may be supplied with a different flux compound. Having multiple sprayers with different solutions allows for cycling the coatings in layers. For example, a first sprayer 32 could spray a flux compound onto the brazing parts 34 for multiple spray and curing cycles. Afterwards, the second sprayer 32 could add a sealant, a metal compound, or any other solution. Metal or alloys could be evenly distributed through the sprayer either before flux is applied or after. Really, any combination of flux, metals, alloys, solutions, treatments could be applied in whatever interval or cycle desired. This may all be done automatically without an operator interrupting the drum sprayer 10, as the hoses 46 may be supplied with different storage vessels of any desired compound. As different flux solutions may be applied using the same drum sprayer 10, the hoses 46 and sprayers 32 may be purged in as little as 25 to 30 minutes.

FIG. 5 shows flux coated brazing rings 48 that have been treated with the drum sprayer 10. As can be seen, the flux is sprayed on very evenly and does not produce any runs or sticking of parts. Using many spray cycles that are followed by curing cycles all under a controlled atmosphere with user-programmable temperature and humidity produce the desired flux coating within 2% through 4% of the target thickness. Optionally, a recovery system may be installed with the exhaust 24 of the drum sprayer 10. A filter may also be used in the exhaust to minimize floating particulates as well as for recovery. This allows for a clean operation. The recovery system may capture the minimal atomized flux spray 30 that does not adhere to the brazing parts 34 and reintroduce the recovered flux into the stored flux solution that is applied by the sprayer 32. This would allow the standard yield of flux coating used 85% to 95% to be increased even higher.

An alternate embodiment of the invention may be seen in FIG. 6. The unique combination of binders and additives with the flux, as shown in the tables and examples below, produces a much more resilient flux coating that enables the use of other non-traditional manufacturing methods. For example, continuous application of flux to a single side of parts is enabled by the conveyor coater 49. A belt 50 continuously rotates through an enclosure 51 which is normally fully enclosed, except for an entrance port 53 and an exit port 55 that allows parts to enter and exit the enclosure 51. Untreated parts 52, such as manifold headers, may be placed on the belt 50 and enter the enclosure 51 at the entrance port 53. Inside the enclosure 51, it is divided into multiple compartments. A plasma cleaning compartment 54 thoroughly cleanses the untreated parts 52 to remove any contaminants, oils, or debris. The plasma cleaner 60 emits plasma 62 for proper cleaning. The belt 50 then advances the pats into a heating chamber 56. While any source of heat may be used, preferably infrared lamps 64 are used to emit infrared radiation 66 to heat the parts to the desired temperature. The heat source may be controlled as well as the speed of the belt 50 to properly achieve the desired temperature. Once the parts are at the desired temperature they may advance to the flux spraying chamber 58. A spray head 68 ultrasonically sprays a flux coating 70 to the parts. As the parts are lying on the belt 50, only a single side of the parts is sprayed with the flux coating 70. The spray head 68 may be located in a desired configuration to direct the flux coating where it is needed. The parts may also be located on the belt 50 in such as manner that only the desired area of the parts are sprayed with the flux coating 70. Additionally, the spray head 68 may be dynamically controlled and programmed to move as it applies the flux spray 70, similar to a robotic arm positioning a welder when welding seams on a vehicle chassis. The final product is a flux coated part 72 that is ready for brazing with application of any additional flux.

The conveyor coater 49 allows for a part itself to be prepped for flux, and have flux applied directly to the part. This eliminates the need to apply any flux at all during assembly and manufacturing. Traditionally, flux is applied with a brush just prior to brazing. Alternatively, flux may be included inside the filler wire or coated on the filler wire. Either way, the flux must be applied at the brazing site. The conveyor coater 49 allows for batch treatment of many different parts of any size/dimension. The spray head may be located, or programmed to move, to the desired area and only spot-treat the desired areas with a flux coating. Additionally, multiple spray heads may be included to spray additional coatings. Metals or alloys may also be sprayed to eliminate the need for filler metals to be applied at the brazing site. There is no limitation on how many chambers the enclosure may include or how large the enclosure may be. Similarly, the parts do not necessarily need to be cleaned with the plasma cleaner 60 or heated with the infrared lamps 64. Any effective cleaning apparatus or heating apparatus may alternatively be used.

Figure 7:
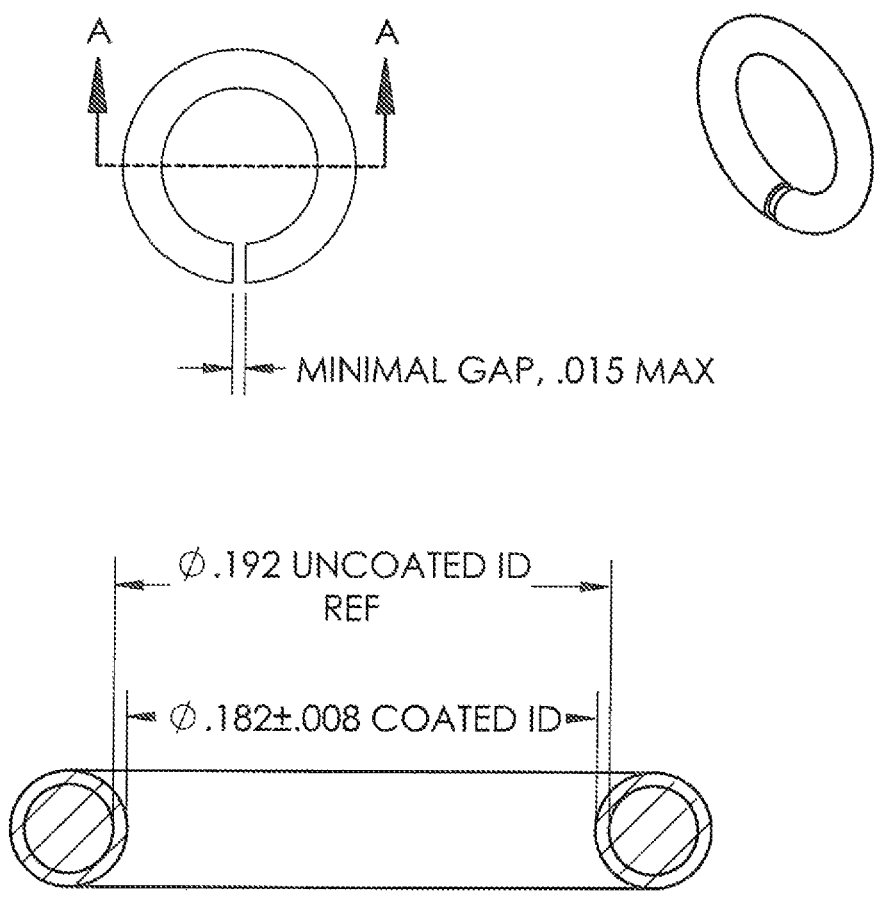
FIG. 7 illustrates one embodiment of a preform coated with the inventive process.
Figure 8:
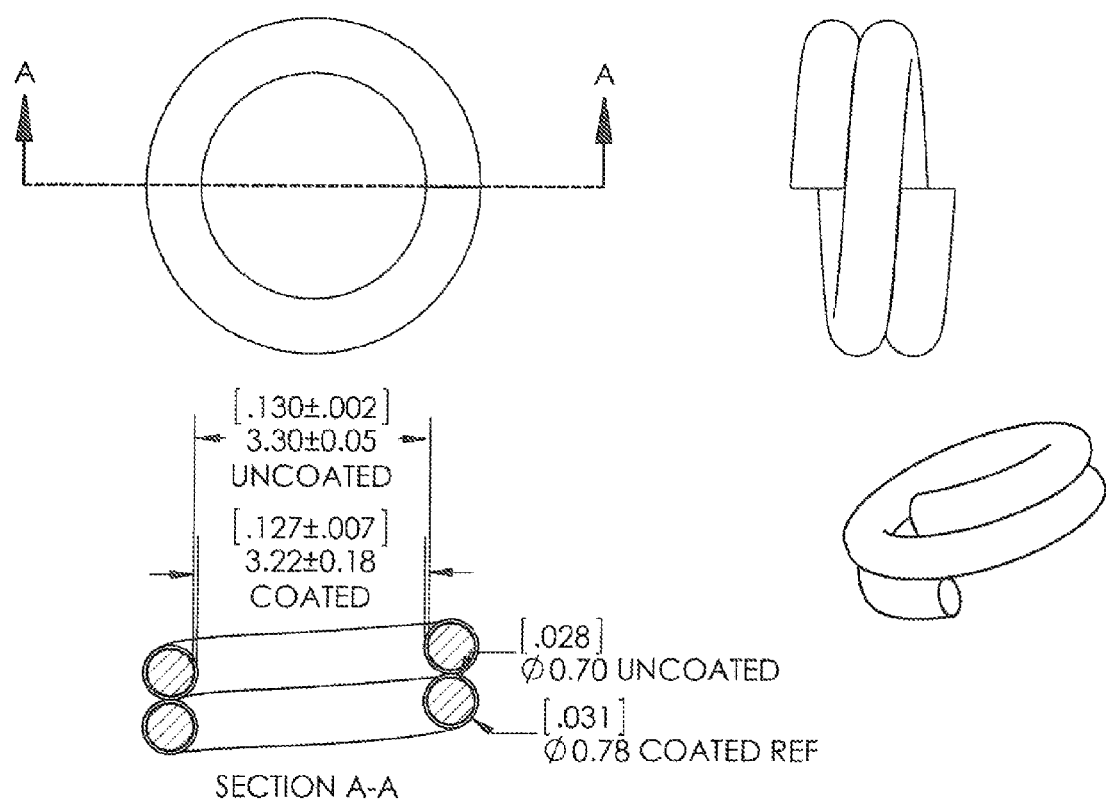
FIG. 8 illustrates one embodiment of a preform coated with the inventive process.

Looking at FIGS. 7 and 8, one embodiment of a preform is shown coated with the inventive coating and inventive process. FIGS. 7 and 8 also indicate the tight tolerance the coating procedure produces and its ability to consistently apply a very controlled, uniform coating.

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

TABLES

| CUSTOMER | |
|---|---|
| Date: | Mar. 25, 2013 |
| ALLOY: | 32-380 form 83 coated |
| START SIZE | .028"× .128" |
| COATED SIZE | .031" × .120" +/− .002 |
| JOB NUMBER: | 918683 |
| COATING TYPE (ID & C0DE) | code 84-413 |
| SURFACING | solvent clean/38 Dyne wettability |
| COATING LOT NUMBER | X6950 |
| COATING START WEIGHT | 2541 grams |
| ALLOY START QTY | 10000 |
| ALLOY LOT NUMBER | 251370/244518 |
| ALLOY BULK WEIGHT | 909 grams |
| ALLOY PIECE WEIGHT | .0911 grms (average) |
| TARGET COATED BULK WEIGHT | 988.03 grams |
| TARGET COATED PIECE WEIGHT | .09902 grams |
| TARGET COATED THICKNESS/ID | 0.031" × .120" ID +/− .002" |
| PROCESS LOCATION/MACHINE ID | |
| COATING PROCESS OPERATOR (S) | |
| COATING VOLUME/GRAMS/HOUR | 251 |
| COATING APPLICATOR TYPE | Rotamat |
| COATING SPRAY GUN SETTINGS | 5 clicks |

TABLES-continued

| CUSTOMER | |
|---|---|
| PROCESS TEMPERATURE | 30 C. |
| DRUM ANGLE & SPEED | 10 rpm |
| PROCESS START TIME/DATE | 10:25A:00 AM/3/25/2013 |
| PROCESS END TIME/DATE | 12:05 PM 2/13/13. |
| COATING QTY USED | 821 gr. |
| TOTAL PROCESS TIME | 3 hr. 16 min. |
| COATED BULK WEIGHT | 993.1 grms |
| COATED PIECE WEIGHT | .0995 gr |
| FLUX PERCENT | 6.33% |
| BINDER PERCENT | 2.11% |
| TARGET FLUX COVERAGE (g/m^2) | |
| FLUX COVERAGE (g/m^2) | |
| COATED THICKNESS: | .031" |
| COATED ID | .118 to .120 |
| COATED OD | .190" |
| COATING/ALLOY SCRAP QTY: | 60% Coating scrap |
| PERCENT YIELD OF COATING ALLOY: | 40% |

SPECIAL NOTES/COMMENTS/RECOMMENDATIONS:
Increases flux content to 18% resulted in heavy cob webbing and coating loss.
This also added to processing time. Suggest original formula w/ 9% flux for next test.

EXAMPLES

Flux Coating Identification

FORMULA #8 REV 2
X6857
Alloy Code: 84-413
Description:
UT/ROTAMAT™ and spray gun compatible flux coating solution for applying a durable coating of flux loadings up to 0.015" for hi-temp alloy braze washers. Surface enhancement is required for adhesion.
Formulation from Sub-Assembly Base:
 1. DMC (80-027) dimethyl carbonate=52%
 2. BINDER BASE X6848 (20% concentration elvacite (iso-butyl methacrylate polymer) 80% DMC)=15.0%
 3. BINDER BASE X6849 (20% concentration polyethylene carbonate 80% DMC)=15.0%
 4. Lucas Milhaupt™ 1166A Flux (82-092) −325 mesh=18%
Formulation Constituents:
 1. DMC (80-027)=76%
 2. Lucas Milhaupt™ 82-092 Flux −325 mesh=18%
 3. BINDER RESIN (80-198) (elvacite 2045(iso-butyl methacrylate polymer), which is an acrylic resin)=3.0%
 4. BINDER RESIN (80-215) (polyethylene carbonate) =3.0%
Procedure:
Equipment:
 1. Polyethylene or Chemical Resistant Mixing Container with Lid. (×2)
 2. Container lid w/slot for mixing blade.
 3. Variable Speed Air Mixer
 4. Dispersion Mixing Blade
 5. Scale Capable to 5000 grams Capacity and to 0.01 grams Sensitivity
 6. Paint filter
 7. Chemical Resistant hand Stirrers and Spatulas/Scoops/Measure Containers.
Mixing Instructions:
 1. In designated mixing container, weigh 15% Batch weight of Binder Base X6848
 2. In designated mixing container, weigh 15% Batch weight of Binder Base X6849

3. In designated mixing container, weigh 52% Batch weight of DMC (80-027);
4. Mount mix to air operated mixer affixed with dispersion mixing blade through slotted lid/
5. In Designated Container, weigh 18.0% 166A (82-092) Flux −325 mesh
6. With slotted lid in place, Mix vigorously to disperse all flux particles into solution, eliminating agglomerates
7. Remove from Mixer and filter through paint filter to screen any debris or larger particles. (Stir or aid with spatula as needed. *** If excessive flux particles are filtered or settle to bottom of mix (0.5%), dry and weigh the flux, then add same weight of 1166A flux to mix. Then filter again.
8. Label with Product ID and Batch Number Special Notes:
1. Mix in well ventilated area.
2. Keep mix covered at all times possible to prevent evaporation or contamination
3. All handling equipment is to be free of foreign matter, dust, oil; moisture.
4. Keep away from excessive heat or open flame.

"Flux Coating Identification":
FORMULA #4 REV 3
Alloy Code: 84-407
Description:
UT/ROTAMA™ and spray gun compatible flux coating solution for applying a durable (light adhesive) coating of flux loadings for controlled atmosphere furnace brazing of aluminum alloy clad parts. Coating is suitable for enclosed or trapped areas. Surface enhancement is required for adhesion.

Formulation from Sub-Assembly Base:
5. DMC (80-027) (dimethyl carbonate)=81%
6. BINDER BASE Q (81-089)=11.25%
7. NOCOLOK® FLUX (82-033)=7.75%

Formulation Constituents:
5. DMC (80-027)=90%
6. NOCOLOK® FLUX (82-033, potassium aluminum fluoride)=7.75%
7. BINDER RESIN (80-215)=2.25%

What is claimed is:

1. A method of applying a brazing flux coating on a plurality of parts for a brazing operation comprising:
preparing the plurality of parts from a metal alloy into a preform in the shape of at least one of a ring, helix, triangle, and other geometric shape;
preparing the flux coating while preventing airborne humidity from being absorbed by the flux coating;
adding an acrylic resin binder to the flux coating;
tumbling the parts in a tumbling drum with a controlled atmosphere including a user definable temperature and humidity within the tumbling drum;
cycling the parts through a coating cycle comprising:
spraying the brazing flux coating from at least one nozzle within the tumbling drum during the tumbling for a user defined period of time;
coating the parts with the brazing flux coating with a uniform thickness of up to 0.015 in (0.381 mm), wherein the brazing flux coating is configured to melt and separate from the preform during the brazing operation;
tumbling the parts following the user defined period of time to cure the brazing flux to a desired hardness; and
repeating the coating cycle for a plurality of repetitions wherein the uniform thickness of brazing flux coating on the parts is uniformly increased with each coating cycle.

2. The method of applying a brazing flux coating on a plurality of parts for a brazing operation of claim 1, further comprising adding an iso-butyl methacrylate polymer to the brazing flux coating.

3. The method of applying a brazing flux coating on a plurality of parts for a brazing operation of claim 2, further comprising mixing polyethylene carbonate with the binder.

4. The method of applying a brazing flux coating on a plurality of parts for a brazing operation of claim 1, further comprising coating the parts with the brazing flux while maintaining a coated weight of the part within 2% of an uncoated weight of the part.

5. The method of applying a brazing flux coating on a plurality of parts for a brazing operation of claim 1, further comprising spraying the flux from a nozzle with an opening from which the coating exits having an internal diameter of 0.05 in (1.27 mm) to 0.08 in (2.032 mm).

6. The method of applying a brazing flux coating on a plurality of parts for a brazing operation of claim 1, further comprising circulating the atmosphere within the tumbling drum with exhaust ducts.

7. The method of applying a brazing flux coating on a plurality of parts for a brazing operation of claim 1, further comprising adhering 85% to 95% of the sprayed brazing flux to the parts.

8. The method of applying a brazing flux coating on a plurality of parts for a brazing operation of claim 1, further comprising:
agitating the parts within the drum with at least one agitator during tumbling;
keeping the brazing flux coating covered prior to use in the tumbling drum to prevent evaporation or contamination of the brazing flux coating; and
maintaining the tumbling drum and the brazing flux coating free of a foreign matter, a dust, an oil, and a moisture prior to use in the tumbling drum.

9. The method of applying a brazing flux coating on a plurality of parts for a brazing operation of claim 1, further comprising spraying a sealant over the parts and brazing flux.

10. The method of applying a brazing flux coating on a plurality of parts for a brazing operation of claim 1, further comprising setting the parts on a conveyor that transports the parts into an enclosure with a plasma cleaning chamber, a heating chamber, and an ultrasonic brazing flux spraying chamber.

11. The method of applying a brazing flux coating on a plurality of parts for a brazing operation of claim 10, further comprising plasma cleaning the parts in the plasma cleaning chamber to remove contaminants allowing a proper adhesion of the brazing flux coating to the parts.

12. The method of applying a brazing flux coating on a plurality of parts for a brazing operation of claim 11, further comprising heating the parts after plasma cleaning in the heating chamber to a desired temperature.

13. The method of applying a brazing flux coating on a plurality of parts for a brazing operation of claim 12, further comprising spraying the parts after heating with an ultrasonic sprayer configured to atomize a liquid brazing flux solution and coat a single side of the parts with the brazing flux coating and leaving an opposing side of the part free of the brazing flux coating.

14. The method of applying a brazing flux coating on a plurality of parts for a brazing operation of claim 10, further comprising adjusting a speed of the conveyor to dry the parts to a desired moisture content.

15. The method of applying a brazing flux coating on a plurality of parts for a brazing operation of claim 1, further comprising spraying one of a metal and an alloy on the brazing flux coated parts, thus eliminating a need for an additional subsequent filler metal application during a brazing procedure.

16. The method of applying a brazing flux coating on a plurality of parts for a brazing operation of claim 1, wherein the uniform thickness of the brazing flux coating on the parts is within 2% of a desired thickness.

17. The method of applying a brazing flux coating on a plurality of parts for a brazing operation of claim 1, further comprising:
preparing the brazing flux coating by mixing dimethyl carbonate, a binder, and a flux followed by filtering the brazing flux coating with a filter size of 325 mesh or smaller;
preventing a moisture from ambient air from being absorbed by the brazing flux coating by sealing the flux coating at all times prior to the spraying;
cleaning the parts free of any oils or residues prior to the coating;
adjusting a spray nozzle opening size to 0.050 in to 0.080 in;
adhering 85% through 95% of the sprayed brazing flux coating to the parts; and
coating the parts within 2% of a desired brazing flux coating thickness.

18. A method of applying a brazing flux coating on a plurality of parts for a brazing operation comprising:
preparing the plurality of parts from a metal alloy into a preform in the shape of at least one of a ring, helix, triangle, and other geometric shape;
adding an acrylic resin binder to the flux coating;
preventing a moisture from ambient air from being absorbed by the flux coating by sealing the flux coating at all times prior to a spraying operation;
maintaining the brazing flux coating in a moisture-free environment prior to application;
spraying the brazing flux coating from at least one nozzle within a tumbling drum during a tumbling operation for a user defined period of time;
maintaining a moisture and temperature level within the tumbling drum at a predetermined level;
coating the parts with the sprayed brazing flux with a uniform thickness up to 0.015 in (0.381 mm) thick while maintaining the coating thickness within a 2% deviation of a targeted thickness, wherein the brazing flux coating is configured to melt and separate from the preform during the brazing operation;
tumbling the parts following the user defined period of time; and
curing the brazing flux to a desired hardness within the tumbling drum with the maintained moisture and temperature level.

19. The method of applying a brazing flux coating on a plurality of parts for a brazing operation of claim 17, further comprising:
mixing an iso-butyl methacrylate polymer with the brazing flux; and
mixing a polyethylene carbonate with the binder.

20. A method of applying a brazing flux coating on a plurality of parts comprising:
preparing the plurality of parts from a metal alloy into a preform in the shape of at least one of a ring, helix, triangle, and other geometric shape;
adding an acrylic resin binder to the flux coating;
preventing a moisture from ambient air from being absorbed by the flux coating by sealing the flux coating at all times prior to a spraying operation;
spraying the brazing flux from at least one nozzle with an opening of 0.05 in (1.27 mm) to 0.08 in (2.032 mm);
tumbling the parts for a user defined period of time within a tumbling drum;
coating the parts with the sprayed brazing flux to a uniform thickness, wherein the brazing flux coating is configured to melt and separate from the preform during the brazing operation;
curing the brazing flux to a desired hardness by circulating an atmosphere within the tumbling drum with exhaust ducts;
maintaining the uniform thickness within at least one of 2% of a desired thickness; and
adhering 85% to 95% of the sprayed flux to the parts.

* * * * *